United States Patent [19]

Okonogi et al.

[11] Patent Number: 4,717,571

[45] Date of Patent: Jan. 5, 1988

[54] METHOD FOR MANUFACTURING A DESSERT HAVING AN ORNAMENTAL PATTERN

[75] Inventors: Shigeo Okonogi; Hiroya Yuguchi, both of Tokyo; Keizi Morimoto, Matsudo; Minoru Ohta, Ohmiya, all of Japan

[73] Assignee: Morinaga Milk Industry Co., Ltd., Tokyo, Japan

[21] Appl. No.: 819,407

[22] Filed: Jan. 16, 1986

[30] Foreign Application Priority Data

Jan. 25, 1985 [JP]  Japan ................................. 60-10783

[51] Int. Cl.$^4$ .............................................. A23L 1/04
[52] U.S. Cl. .................................... 426/104; 426/249; 426/279; 426/573
[58] Field of Search ............... 426/249, 279, 573, 575, 426/576, 577, 104

[56] References Cited

U.S. PATENT DOCUMENTS

| | | | |
|---|---|---|---|
| 3,892,870 | 7/1975 | Wood | 426/575 |
| 3,941,892 | 3/1976 | Glasser et al. | 426/575 |
| 4,190,676 | 2/1980 | Göringer et al. | 426/575 |
| 4,200,661 | 4/1980 | Brigand et al. | 426/577 |
| 4,202,908 | 5/1980 | Nesmeyanov et al. | 426/577 |
| 4,375,481 | 3/1983 | Kuwabara et al. | 426/576 |
| 4,500,553 | 2/1985 | Liggett et al. | 426/249 |

FOREIGN PATENT DOCUMENTS 7213938  4/1973  Netherlands ....................... 426/249

*Primary Examiner*—Jeanette Hunter
*Attorney, Agent, or Firm*—Oblon, Fisher, Spivak, McClelland, & Maier

[57] ABSTRACT

A method of manufacturing solid or semi-solid dessert products, wherein each of liquid materials for base and one or more kinds of sauces contains an assortment of two or more kinds of gelling agents. Each of liquid materials for a base and one or more kinds of sauces is prepared and then cooled to form a gel and then destroyed to obtain a homogeneous pasty material for base or each of sauces. The resulting pasty material for base is filled into a container and immediately thereafter the resulting one or more kinds of pasty materials for sauces are filled onto, above and/or under the surface of the base material to form an ornamental pattern. Finally the materials filled into a container are cooled for gelling.

3 Claims, 3 Drawing Figures

METHOD FOR MANUFACTURING A DESSERT HAVING AN ORNAMENTAL PATTERN

TECHNICAL FIELD

The present invention relates to a method for manufacturing a solid or semi-solid dessert such as a jelly, pudding, babarois, yogurt, mousse and MIZU-YOH-KAN (soft sweet jellied bean paste). More particularly, the present invention relates to a method for forming an ornamental pattern, in a dessert, which is stable against vibrations and shocks which may occur during manufacturing, transporting and/or storing.

GROUND ART

Heretofore solid or semi-solid dessert products having ornamental patterns have been manufactured using various kinds of methods which are categorized into two types. In the method of first type, a gellable liquid material for base and one or more kinds of solid materials e.g., pulps (of fruits), beans and/or dry confectionery, are utilized to form an ornamental pattern in a dessert product. In the method of second type, a gellable liquid material for base and one or more kinds of gellable liquid materials for sauce are utilized to form an ornamental pattern in a dessert product.

In the first type, one of the typical methods is, a gellable liquid material for base is filled into a suitable container, then one or more kinds of solid materials are added thereto, while the liquid material for base maintains its flowability, and then they are cooled for gelling. Another one of the typical methods categorized into first type is, one or more kinds of solid materials are preliminarily mixed with a gellable liquid material for base to obtain a mixture material, and the thus obtained mixture material is filled into a container, and then it is cooled for gelling. These methods have been found to be preferable to form an ornamental pattern which is stable against vibrations and/or shocks, however, when distribution of a material containing or consisting of solid materials is automated by machines, pieces of solid materials tend to be destroyed and accurate measuring of such material cannot be assured. In order to eliminate such problems, distribution of such materials must be manually made that causes problems of low efficiency and unsanitariness.

In the methods of second type, one of the typical ones is, a gellable liquid material for base and at least a gellable liquid material for sauce are separately prepared. The liquid material for base is filled into a space between two molds which lie one upon another, and they are cooled for gelling. After removing the upper mold the liquid material for sauce is filled into the recess formed by the upper mold in the gelled base material, and then they are cooled again for gelling. Another one of the typical methods categorized into second type is, a plurality of gellable liquid materials are separately prepared and they are respectively filled into a plurality of spaces in a container partitioned with one or more of removable walls. After cooling them for gelling, said removable walls are removed to form an integrated dessert. The former has some defects, which are, low efficiency derived from double cooling steps, and involvement of a complicated machines for handling removable upper mold when its operation is automated under an aseptic condition. The latter also requires a complicated machine for handling removable partition walls when its operation is automated under an aseptic condition.

In Japanese Patent Application No. 58(1983)-47864 published under TOKUKAI Publication No. 59(1984)-173055 which was assigned to the same assignee of the present invention, an improved method is disclosed for solving the drawbacks in prior art methods described above. In the method of the previous application, a gellable liquid material for base and at least a gellable liquid material for sauce are separately prepared adjusting their specific gravities nearly equal. The liquid material for base is filled into a suitable container at a temperature equal to or higher than its gelling temperature and then the liquid material for sauce is extruded on, above and/or under the surface of base material at a temperature equal to or lower than its gelling temperature to thereby form a desired pattern and then they are cooled for gelling. Though this method is rather preferable, when the difference of specific gravities of two liquid materials become larger, levels of ornamental patterns formed with the sauce material in the base cannot be controlled. Furthermore, when extrusion pressure of the sauce is relatively high, a desired clear pattern cannot be formed. Although the latter problem may be solved by use of a lower extrusion pressure, that causes low efficiency problem.

SUMMARY OF THE INVENTION

It is an object of the present invention to provide an improved method categorized into said second type described above.

It is another object of the present invention to provide an improved metod for forming a desired ornamental pattern in a dessert product without deformation and lack of clearness of boundary between base and sauce during its production, transportation and/or preservation.

It is a further object of the present invention to provide a simple method of continuous manufacturing those kinds of dessert products.

In accordance with the present invention, a liquid material for base and one or more kinds of liquid material for sauce are separately prepared. Each of a liquid material for base and one or more kinds of liquid materials for sauce contains two or more kinds of gelling agents in a predetermined assortment selected from gelatin, agar, furcellaran, carrageenan, low methoxyl pectin (hereinafter abbreviated as LM) and a mixture of locust bean gum and xanthan gum (hereinafter abbreviated as LX). It has been known that these gelling agents have different characteristics, for example, different gelling temperatures, and variable gelling temperatures under different conditions in pH value or percentage of multi-valent metalic ions in a liquid containing the gelling agent concerned.

Each of liquid materials for base and sauce is prepared by applying a combination of following three conditions which is selectable from a plurality of predetermined combinations:

(i) an assortment of two or more kinds of gelling agents to be contained in a liquid material, and/or
(ii) a pH value to which a liquid material for base or sauce may or may not be adjusted, and/or
(iii) a percentage of multi-valent metalic ions to which a liquid material for base or sauce may or may not be adjusted.

A combination of said three conditions applicable to a liquid material for base and the one applicable to any one of liquid materials for sauce are related each other, and must be selected in a pair out of predetermined 12 pairs of combinations of said three conditions.

A pair of combinations of said three conditions is selected out of said 12 pairs, and one of the combinations in a selected pair is applied to a liquid material for base and the other is applied to one or more kinds of liquid materials for sauce.

Each of liquid materials for base and sauce may have a plurality of gelling temperatures or a single gelling temperature depending upon the combination of said three conditions applied thereto. The wordings "to have a plurality of gelling temperatures" herein means that when a liquid material is prepared using two or more kinds of gelling agents in a certain assortment at an elevated temperature at which gelling of the liquid material is not induced and when it is gradually cooled, rapid gelling is advanced at different temperatures step by step.

When a liquid material has a plurality of gelling temperatures, said liquid material is prepared at a temperature higher than its highest gelling temperature. Then resulted gellable liquid material is cooled to a temperature equal to or lower than its highest gelling temperature but higher than its lowest gelling temperature for gelling. The thus obtained gelled material is sufficiently agitated to destroy the gel structure for obtaining a homogeneous pasty material at the temperature rapid gelling is initiated.

When a liquid material has a single gelling temperature, said liquid material is prepared at a temperature higher than its gelling temperature. The resulted gellable liquid material is cooled to a temperature equal to or lower than its gelling temperature for gelling.

The thus obtained gelled material is sufficiently agitated to destroy the gel structure for obtaining a homogeneous pasty material.

The resulted pasty base material is filled into a suitable container, and while it is maintaining its flowability, one or more kinds of pasty sauce materials are respectively extruded with one or more of filler nozzles onto, above and/or under the surface of base material for forming a desired ornamental pattern therein. After sealing the container, they are cooled for gelling to thereby obtain a dessert product.

DESCRIPTION OF PREFERRED EMBODIMENTS

Figure 1:
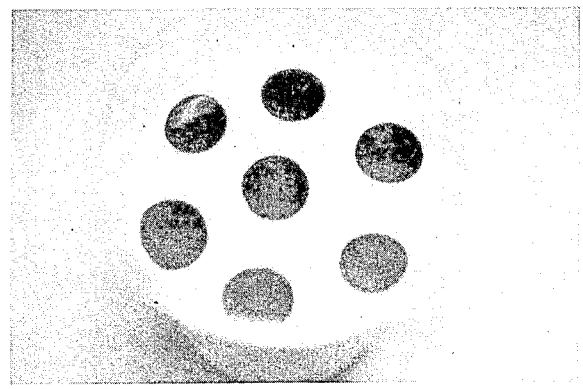
Figure 2:
Figure 3:
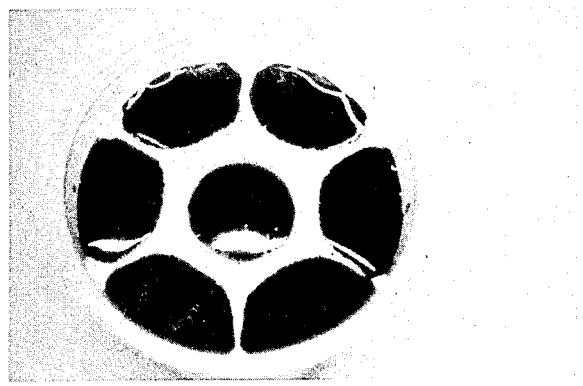

The gelling agents used in the present invention are gelatin, agar, furcellaran, carrageenan, low methoxyl pectin, and a mixture of locust bean gum and xanthan gum. The ratio of locust bean gum and xanthan gum is 1:10~2:1 by weight. These gelling agents have different characteristics, for example, different gelling temperatures, variable gelling temperatures under acidic (pH 5.5~3.0) and neutral (pH 5.5~7.0) conditions or different percentages of multi-valent metalic ions. The quantities to be used and gelling tewmperatures of the respective gelling agents under different conditions are shown hereunder:

| gelling agent | quant. (%) | gelling temperature (°C.) | | | |
|---|---|---|---|---|---|
| | | pH conditions | | ionic conditions | |
| | | neut. | acid. | 10 mg/ 100 g | 30 mg/ 100 g |
| gelatin | 0.5~2.0 | 15~20 | 15~20 | — | — |
| agar | 0.1~0.4 | 35~40 | 30~40 | — | — |
| furcellaran | 0.5~1.0 | 45~55 | 30~40 | — | — |
| carrageenan | 0.2~0.5 | 45~55 | 30~40 | — | — |
| LM | 0.5~1.5 | — | — | 20 | 35 |
| LX | 0.2~0.5 | 45~55 | 30~40 | — | — |

Note: Total solid contents of liquid material are 20–30% by weight.

Multi-valent metalic ions in a liquid material can be derived from basic dessert materials such as milk products, soy bean juice products, fruit juice or food additives (any compounds which are allowed to be added to food) such as calcium carbonate, calcium lactate.

A value of pH in a liquid material may also be derived from basic dessert materials such as fruit juice, fermented milk products or food additives (any compounds which are allowed to be added to food) such as alkaline agents and acid agents.

A combination of said three conditions to be applied to a liquid material for base or sauce is selectable from a plurality of combinations shown in following TABLE 1. A combination applied to either one of liquid materials for base and a combination applied to one or more of liquid materials for sauce should be selected in a pair out of 12 pairs (a)–(l) as shown in TABLE 1. It is a matter of choice which of two combinations in a sellected pair are to be applied to a liquid material for base or one or more kinds of liquid materials for sauce. For the purpose of explanation, a set of combinations each consisting of one of two combinations in the respective pairs is named as group A and the other ones each consisting of the other of two combinations in the respective pairs is named as group B.

TABLE 1

| | group A | | | group B | | |
|---|---|---|---|---|---|---|
| | gelling agents | multi-valent metalic ion (concentration) | pH | gelling agents | multi-valent metalic ion (concentration) | pH |
| a | GE and one or more of LX, FA, LM and CA | if LM is contained, a quantity required for gelling | 7.0~5.5 | GE and one or more of LX, FA, LM, CA | if LM is contained, a quantity required for gelling | 7.0~5.5 |
| b | GE and one or more of LX, FA, LM and CA | if LM is contained, a quantity required for gelling | 7.0~5.5 | GE and AG | not necessary | 7.0~3.0 |
| c | GE and one or more of LX, FA, LM and CA | if LM is contained, a quantity required for gelling | 7.0~5.5 | AG and one or more of FA, CA, LX and LM | if LM is contained, a quantity required for gelling | 7.0~5.5 |
| d | GE and AG | not necessary | 7.0~3.0 | GE and AG | not necessary | 7.0~3.0 |
| e | GE and AG | not necessary | 7.0~3.0 | AG and one or more of FA, CA, LX and LM | if LM is contained, a quantity required for gelling | 7.0~5.5 |
| f | AG and one or more of FA, CA, LX and LM | if LM is contained, a quantity required for gelling | 7.0~5.5 | AG and one or more of FA, CA, LX and LM | if LM is contained, a quantity required for gelling | 7.0~5.5 |

TABLE 1-continued

| | group A | | | group B | | |
|---|---|---|---|---|---|---|
| | gelling agents | multi-valent metalic ion (concentration) | pH | gelling agents | multi-valent metalic ion (concentration) | pH |
| g | GE and one or more of LX, FA and CA | 100 mg/100 g or more | 7.0~5.5 | LM and one or more of AG, FA, LX and CA | 10 mg/100 g or less | 7.0~3.0 |
| h | GE and one or more of LX, FA and CA | 100 mg/100 g or more | 7.0~5.5 | GE and LM | 10 mg/100 g or less | 7.0~5.5 |
| i | AG and GE | 100 mg/100 g or more | 7.0~3.0 | LM and one or more of AG, FA, LX and CA | 10 mg/100 g or less | 7.0~3.0 |
| j | AG and GE | 100 mg/100 g or more | 7.0~3.0 | GE and LM | 10 mg/100 g or less | 7.0~5.5 |
| k | AG and one or more of LX, CA and FA | 100 mg/100 g or more | 7.0~5.5 | LM and one or more of AG, FA, LX and CA | 10 mg/100 g or less | 7.0~3.0 |
| l | AG and one or more of LX, CA and FA | 100 mg/100 g or more | 7.0~5.5 | GE and LM | 10 mg/100 g or less | 7.0~5.5 |

Note:
LX: mixture of locust bean gum and xanthan gum,
FA: furcellaran,
LM: low methoxy pectin,
CA: carrageenan,
GE: gelatin,
AG: agar In selecting a pair of combinations out of the predetermined 12 pairs, and in selecting a combination between two combinations in the selected pair to use for the base or one or more kinds of sauces, following factors are preferred to be considered:

(1) the values of pH
(2) percentage of multi-valent metalic ions in the aimed dessert
(3) the influence of gelling agents to mouthfeel of the aimed dessert.

For example, when fruit jelly which is acidic is used as a basic material for sauce and when yogurt which contains multi-valent metallic ions in a high concentration is used as a basic material for base, a pair of combinations of (d) or (i) is suitable. When (i) is selected, a combination belonging to group A in said pair is preferably applied to yogurt base and the other is applied to fruit jelly sauce.

As will be seen from TABLE 1, in some combinations, assortment of gelling agents to be contained in a liquid material is not selectable (cf. a combination belonging to group A in a pair of (d)), and in some combinations, assortment of gelling agents is selectable (cf. a combination belonging to group A in a pair of (a)). In a selectable combination, plural assortments are applicable to plural liquid materials for sauce respectively considering the points of veiw described above.

As referred to before, any of the liquid materials has plural gelling temperatures or a single gelling temperature depending upon the combination of said three conditions applied thereto. These plural gelling temperatures can be detected as described hereunder. A liquid material is prepared at an elevated temperature at which gelling of the liquid material is anticipated not to be induced. Then resulted liquid is gradually cooled. When rapid gelling of the liquid is observed, the liquid is maintained at that temperature for gelling. While keeping the same temperature, resulted gel is fully destroied by agitation to obtain a homogeneous pasty material. The resulted pasty material is gradually cooled, and when rapid gelling of the pasty matertial is observed again, the material is maintained at that temperature to form a gel. Repeating the same steps, plural gelling temperatures can be detected. When a liquid material has a single gelling temperature, secondary gelling will not be observed. Certainly it is anticipated whether a liquid material has plural gelling temperatures or a single gelling temperature considering the combination of said three conditions applied thereto.

After determining the combinations of three conditions to be applied to the liquid materials for base and sauce of the aimed dessert, a dessert having an ornamental pattern is prepared as follows.

After predetermined quantities of all the ingredients for base to a predetermined quantity of water, they are sufficiently dispersed and/or dissolved into water, if necessary at an elevated temperature, and if necessary using a homogenizer. The resulted liquid material for base is subjected to sterilization or pasteurization. One or more kinds of liquid materials for sauce are separately prepared in the same manner as in preparation of the liquid material for base. Each of the liquid materials is cooled to either one of the temperatures specified hereunder depending upon the combinations of said three conditions applied thereto to form a gel respectively.

(i) a temperature equal to or lower than the highest gelling temperature but higher than the lowest gelling temperature, when a liquid material has plural gelling temperatures
(ii) a temperature equal to or lower than the gelling temperature, when a liquid material has a single gelling temperature Each of the resulted gelled materials is agitated to destroy its gel structure and to obtain homogeneous pasty material for base or one or more kinds of sauces.

A predetermined quantity of the resulted pasty base material is filled into a container, and while it maintains its flowability, one or more kinds of the resulted pasty sauce materials are extruded with one or more of filler nozzles placed onto, above and/or under the surface of the base material in the container to thereby form a desired ornamental pattern. Various kinds of ornamental patterns can be formed by varying shapes, and inner diameters of nozzles and/or varying extruding pressures and/or relative positions between the nozzles and/or containers during extrusion process. After sealing the container, resulted packaged materials are cooled for gelling.

It will be understood that various kinds of desserts having various kinds of ornamental patterns can be manufactured by using two or more kinds of sauce materials which have different colors and/or different flavors.

Having generaly described the present invention, some exemplifying tests will be described for a better understanding of the features of the present invention hereunder.

TEST 1

The purpose of this test is to exemplify the effectiveness of inclusion of two or more kinds of gelling agents, in a liquid material, which have different gelling conditions and necessity of provisional gelling induced in each of liquid materials for base and sauces at a temperature which is determined by the combinations of gelling agents applied thereto.

Ingredients for two samples of base and two samples of sauce were prepared as shown in TABLE 2.

TABLE 2

|  | ingredients for sauces | | ingredients for bases | |
|---|---|---|---|---|
|  | sample A | sample B | sample 1 | sample 2 |
| sugar | 200.0 | 200.0 | 50.0 | 150.0 |
| coloring material | 1.0 | 1.0 | — | — |
| agar solution (2 wt. %) | 100.0 | — | 100.0 | — |
| gelatin | 12.0 | 12.0 | 12.0 | 12.0 |
| skim milk powder | — | — | 50.0 | 50.0 |
| water | 687.0 | 787.0 | 788.0 | 788.0 |
| total | 1000 | 1000 | 1000 | 1000 |

All the ingredients except the 2 wt. % agar solution were obtainable in the market. The 2 wt. % agar solution was prepared by dispersing agar obtainable in the market in a given quantity of water and boiling them for dissolution.

Each of the ingredients for sauces and bases other than 2 wt. % agar solution was separately added to a given quantity of water. Then each of the resulted liquid was heated respectively. When the respective liquids reached to 40° C., they were mixed each other and then 2 wt. % agar solution was added to the resulted mixture only for sample A and sample 1. A quantity of water was added to the respective samples untill they reach 1000 g each. The respective samples were pasteurized at 90° C. for 10 minutes, and each of them were distributed into 4 containers to obtain 4 sets of respective samples. A set of samples was used for detecting gelling temperatures and spesific gravities thereof, and each of the remaining three sets of samples were cooled to 50°, 30° and 10° C. respectively for comparative test.

Gelling temperatures of the samples were respectively detected as described hereunder. While each of the samples pasteurized at 90° C. was gradually cooled, viscosity of the sample was measured with a B-type viscosimeter (by TOKYO KEISOKUKI SEIZOUSHO) at every 5° C. When its viscosity was rapidly increased, the sample was held at that temperature (hereinafter referred to as 1st gelling temperature) to form a gel. The gelled sample was agitated with a TK-Homomixer (by TOKUSHU KIKA KOUGYO) to destroy the resulted gel structure, maintaining its 1st gelling temperature, and homogeneous pasty sample was obtained. The resulted pasty sample was gradually cooled again to observe whether rapid gelling of the sample was indused or not. At the sametime, viscosity of the sample was measured in the same manner as described. The temperature the rapid gelling was initiated in second time is hereinafter referred to as "2nd gelling temperature". The specific gravities of the samples were measured at 50° C. with a hydrometer (by TOKYO MOMOKI SEISAKUSHO). The gelling temperatures and specific gravities of the samples are shown in TABLE 3.

TABLE 3

|  | sauce | | base | |
|---|---|---|---|---|
|  | A | B | 1 | 2 |
| 1st gelling temperature | 35° C. | 17° C. | 35° C. | 17° C. |
| 2nd gelling temperature | 17° C. | — | 17° C. | — |
| specific gravity(50° C.) | 1.08 | 1.08 | 1.04 | 1.08 |

Each of six samples consisting of two kinds of base materials each kept at three different temperatures were distributed into twelve containers respectively. While they maintained their flowability, each of six samples consisting of two kinds of sauce materials each held at three different temperatures were extruded under two different linear extrusion velocities respectively on the surface of base materials filled in the containers. They they were cooled for gelling. The observation of the resulted dessert products are shown in TABLE 4.

TABLE 4

|  |  | filling condition for base | | | | | |
|---|---|---|---|---|---|---|---|
|  |  | sample 1 | | | sample 2 | | |
| filling condition for sauce |  | 50° C. | 30° C. | 10° C. | 50° C. | 30° C. | 10° C. |
| Sample A |  |  |  |  |  |  |  |
| 50 cm/sec | 50° C. | x | x | x | x | x | x |
|  | 30° C. | x | ⊙ | ⊙ | x | x | ⊙ |
|  | 10° C. | x | ⊙ | ⊙ | x | x | ⊙ |
| 25 cm/sec | 50° C. | x | x | x | x | x | x |
|  | 30° C. | x | ⊙ | ⊙ | x | x | ⊙ |
|  | 10° C. | x | ⊙ | ⊙ | ⊙ | ⊙ | ⊙ |
| Sample B |  |  |  |  |  |  |  |
| 50 cm/sec | 50° C. | x | x | x | x | x | x |
|  | 30° C. | x | x | x | x | x | x |
|  | 10° C. | x | ⊙ | ⊙ | x | x | ⊙ |
| 25 cm/sec | 50° C. | x | x | x | x | x | x |
|  | 30° C. | x | x | x | x | x | x |
|  | 10° C. | x | ⊙ | ⊙ | ⊙ | ⊙ | ⊙ |

Note:
⊙ formed ornamental pattern (cf. photo. 1 attached)
x did not formed ornamental pattern (cf. photo 2 attached)

The resulted products were stored at 5° C. for 2 hours, and then they were subjected to stability test by applying 10 cycles of vibrations with amplitude of 25 cm and a cycle per second. The results are shown in TABLE 5.

TABLE 5

|  |  | filling condition for base | | | | | |
|---|---|---|---|---|---|---|---|
|  |  | sample 1 | | | sample 2 | | |
| filling condition for sauce |  | 50° C. | 30° C. | 10° C. | 50° C. | 30° C. | 10° C. |
| Sample A |  |  |  |  |  |  |  |
| 50 cm/sec | 50° C. | x | x | x | x | x | x |
|  | 30° C. | x | ⊙ | x | x | x | x |
|  | 10° C. | x | x | x | x | x | x |
| 25 cm/sec | 50° C. | x | x | x | x | x | x |
|  | 30° C. | x | ⊙ | x | x | x | x |
|  | 10° C. | x | x | x | x | x | x |
| Sample B |  |  |  |  |  |  |  |
| 50 cm/sec | 50° C. | x | x | x | x | x | x |
|  | 30° C. | x | x | x | x | x | x |
|  | 10° C. | x | x | x | x | x | x |
| 25 cm/sec | 50° C. | x | x | x | x | x | x |
|  | 30° C. | x | x | x | x | x | x |
|  | 10° C. | x | x | x | x | x | x |

Note:
⊙ not deformed
x deformed

From the results of this test, it was exemplified that a stable ornamental pattern could be formed in a dessert under those conditions and the process as follows:

At least two kinds of gelling agents which have different gelling conditions were included in each of liquid materials for base and sauce, each of liquid materials was cooled to a temperature equal to or lower than the higher gelling temperature but higher than the lower gelling temperature once to forma gel.

The resulted gel structure was destroyed by sufficient agitation to obtain a pasty material, and the thus obtained pasty material for base was filled into a container. While it maintained its flowability, the obtained pasty material for sauce was extruded on the surface of base material, and then they were cooled for gelling.

Also it was exemplified that a desirablly stable ornamental pattern can be formed even when relatively large difference in specific gravities resided between base and sauce materials, and when relatively large linear verocity was applied for filling.

TEST 2

The purpose of this test is to exemplify applicability of a combination of gelling agents which gives a single gelling temperature.

The ingredients shown in Table 6 were prepared, wherein all the ingredients other than 2 wt.% agar solution were obtainable in the market.

TABLE 6

|  | ingredients for sauce | ingredients for base |
|---|---|---|
| LM | 10.0 | — |
| LX | 2.0 | — |
| β-carotene | 1.0 | — |
| sugar | 150.0 | 200.0 |
| cornstarch | — | 20.0 |
| 2% agar solution | — | 100.0 |
| gelatin | — | 15.0 |
| calcium chloride | — | 0.3 |
| water | 837.0 | 664.7 |
| total | 1000 | 1000 |

The 2 wt.% agar solution was prepared in the same manner as in Test 1. The ratio of locust bean gum to xanthan gum in LX was 1:5 by weight.

Each of samples of liquid materials for sauce and base was prepared in the same manner as in Test 1. Using a part of respective samples, gelling temperatures and specific gravities thereof were measured in the same manner as in Test 1. The results are shown in Table 7.

TABLE 7

|  | sample of base | sample of sauce |
|---|---|---|
| 1st gelling temperature | 35° C. | 50° C. |
| 2nd gelling temperature | 15° C. | — |
| specific gravity | 1.08 (55° C.) | 1.06 (55° C.) |

The remaining parts of the respective samples were cooled to 30° C. to form a gel. The pasty materials for base and sauce were prepared, in the same manner as in Test 1. The pasty material for base was filled into containers, and then the pasty material for sauce was extruded on the surface of previously filled base material with linear filling velocities of 50 cm/sec and 25 cm/sec to form ornamental patterns therein. After sealing the containers, the thus obtain packages were cooled in a refrigerator and then they were subjected to stability test in the same manner as in Test 1. The ornamental patterns in the obtained dessert products showed good stability.

From this test, it was exemplified that even if the materials for base and sauce had a single gelling temperature, stable ornamental patterns could be formed when base and sauce can be solidified upon contact at their surfaces. Also it was exemplified that a desirablly stable ornamental pattern can be formed even when relatively large difference in specific gravities resided between base and sauce material, and when relatively large linear verocity was applied for filling.

TEST 3

The purpose of this test is to exemplify assortments of gelling agents which give plural gelling temperatures to a liquid material under neutral condition (pH 7.0~5.5).

The ingredients for samples 3-17 shown in Table 8 were prepared, wherein all the ingredients other than 2 wt. % agar solution were obtainable in the market.

TABLE 8

| ingredients | sample numbers | | | | | | | |
|---|---|---|---|---|---|---|---|---|
|  | 3 | 4 | 5 | 6 | 7 | 8 | 9 | 10 |
| sugar | 200 | 200 | 200 | 200 | 200 | 200 | 200 | 200 |
| LX | 2 | 2 | 2 | 2 | 2 | — | — | — |
| carrageenan | 2 | — | — | — | — | 2 | 2 | 2 |
| furcellaran | — | 6 | — | — | — | 6 | — | — |
| 2% agar solution | — | — | 100 | — | — | — | 100 | — |
| LM | — | — | — | 10 | — | — | — | 10 |
| gelatin | — | — | — | — | 15 | — | — | — |
| calcium lactate | — | — | — | 2 | — | — | — | 2 |
| water | 796 | 792 | 698 | 786 | 783 | 792 | 698 | 786 |
| total | 1000 | 1000 | 1000 | 1000 | 1000 | 1000 | 1000 | 1000 |

| ingredients | sample numbers | | | | | | |
|---|---|---|---|---|---|---|---|
|  | 11 | 12 | 13 | 14 | 15 | 16 | 17 |
| sugar | 200 | 200 | 200 | 200 | 200 | 200 | 200 |
| LX | — | — | — | — | — | — | — |
| carrageenan | 2 | — | — | — | — | — | — |
| furcellaran | — | 6 | 6 | 6 | — | — | — |
| 2% agar solution | — | 100 | — | — | 100 | 100 | — |
| LM | — | — | 10 | — | 10 | — | 10 |
| gelatin | 15 | — | — | 15 | — | 15 | 15 |
| calcium lactate | — | — | 2 | — | 2 | — | 2 |
| water | 783 | 694 | 782 | 779 | 688 | 685 | 773 |
| total | 1000 | 1000 | 1000 | 1000 | 1000 | 1000 | 1000 |

The 2 wt. % agar solution was prepared in the same manner as in Test 1. The ratio of locust bean gum to xanthan gum in LX was the same as in Test 2. Each of samples 3-17 of liquid materials were prepared, in the same manner as in Test 1. Then they were adjusted their pH to 7.0-5.5 using NaOH and HCl. After heating the samples to 90° C., gelling temperatures thereof were measured in the same manner as in Test 1. The results are shown in Table 9.

TABLE 9

| | sample numbers | | | | | | | | | | | | | | | |
|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 |
| F.G.T. | 50 | 50 | 50 | 50 | 50 | 50 | 50 | 50 | 50 | 50 | 50 | 50 | 50 | 35 | 50 |
| S.G.T. | — | — | 35 | — | 15 | — | 35 | — | 15 | 35 | — | 15 | 35 | 15 | 15 |

Note:
F.G.T. = 1st gelling temperature
S.G.T. = 2nd gelling temperature

The results shows that assortments of gelling agents which gave plural gelling temperatures under neutral condition were gelatin and one of gelling agents selected from the group consisting of LX, carrageenan, furcellaran, agar and LM or alternatively agar and one of gelling agents selected from the group consisting of LX, carraggeenan, furcellaran and LM.

TEST 4

The purpose of this test is to exemplify assortments of gelling agents which give plural gelling temperatures to a liquid material under acidic condition (pH 5.5~3.0).

Samples 3–17 of liquid materials were prepared, using the ingredients shown in Table 8, and they were adjusted their pH to 5.5-3.0 using HCl, and then the same test as in Test 3 took place.

The results are shown in Table 10.

TABLE 10

| sample numbers | | | | | | | | | | | | | | | |
|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 |
| F.G.T. | 35 | 35 | 35 | 35 | — | 35 | 35 | 35 | — | 35 | 35 | — | 35 | 35 | — |
| S.G.T. | — | — | — | — | — | — | — | — | — | — | — | — | — | 15 | — |

Note:
F.G.T. = 1st gelling temperature
S.G.T. = 2nd gelling temperature

The results shows that only the assortment of agar and gelatin gave a plurality of gelling temperatures under acidic condition.

TEST 5

The purpose of this test is to exemplify assortments of gelling agents with which gelling is induced upon contact of base and sauce.

Ingredients for samples 18–22 and C–K as shown in Table 11 were prepared, wherein all the ingredients other than 2 wt. % agar solution were obtainable in the market. The agar solution and LX were the same as used in Test 4.

Samples 18–22 of liquid materials, each of which had a single gelling temperature and were named as group I in Table 11, were prepared using respective ingredients. Then they were distributed into two parts to obtain 2 sets of respective samples. Using NaOH or HCl, one set of the samples 18-22 were adjusted their pH to 7.0-5.5, and the other set of samples 18-22 were adjusted to 5.5-3.0. Each of two sets of samples were heated to 90° C., and then cooled to a temperature equal to or lower than its gelling temperature to form a gel which was then destroyed to obtain homogeneous pasty material.

Samples C-K of liquid materials having two gelling temperatures, which were named as group II in Table 11, were prepared using respective ingredients, and they were adjusted their pH to 7.0-5.5 using NaOH or HCl except sample K. Sample K was distributed into two parts one of which was adjusted its pH to 7.0-5.5 and the other of which was adjusted its pH to 5.5-3.0. Each of the samples was heated to 90° C., and then cooled to a temperature equal to or lower than its 1st gelling temperature but higher than its 2nd gelling temperature to form a gel which was then destroyed to obtain homogenous pasty material.

Using a part of each sample of group I as base materials, and a part of each sample of group II as sauce materials, dessert products having an ornamental pattern were prepared in the same manner as in Test 1. The resulted products were subjected to stability test in the same manner as in Test 1. The results are shown in Table 12.

To the contrary, using a part of each sample of group II as base materials, and a part of each sample of group I as sauce materials, dessert products each having an ornamental pattern were prepared in the same manner as in Test 1. The resulted products were subjected to stability test in the same manner as in Test 1. The results exactly corresponded with those shown in Table 12.

TABLE 11

| | sample numbers of group I | | | | | sample numbers of group II | | | | | | | | |
|---|---|---|---|---|---|---|---|---|---|---|---|---|---|---|
| ingredients | 18 | 19 | 20 | 21 | 22 | C | D | E | F | G | H | I | J | K |
| sugar | 200 | 200 | 200 | 200 | 200 | 200 | 200 | 200 | 200 | 200 | 200 | 200 | 200 | 200 |
| β-carotene | 1 | 1 | 1 | 1 | 1 | — | — | — | — | — | — | — | — | — |
| LM | 10 | 10 | 10 | 10 | 10 | — | — | — | — | — | — | 10 | 10 | — |
| LX | 2 | — | — | — | — | 2 | 2 | — | — | — | — | — | — | — |
| carrageenan | — | 2 | — | — | — | — | — | 2 | 2 | — | — | — | — | — |
| furcellaran | — | — | 6 | — | — | — | — | — | — | 6 | 6 | — | — | — |
| 2% agar solution | — | — | — | 100 | — | 100 | — | 100 | — | 100 | — | 100 | — | 100 |
| gelatin | — | — | — | — | 15 | — | 15 | — | 15 | — | 15 | — | 15 | 15 |
| CaCl$_2$ | — | — | — | — | — | 3 | 3 | 3 | 3 | 3 | 3 | 3 | 3 | 3 |
| water | 787 | 787 | 783 | 689 | 774 | 695 | 780 | 695 | 780 | 691 | 776 | 687 | 772 | 682 |

TABLE 12

| | | liquid I | | | | | | | | | |
|---|---|---|---|---|---|---|---|---|---|---|---|
| | | pH 7.0-5.5 | | | | | pH 5.5-3.0 | | | | |
| liquid II | | 18 | 19 | 20 | 21 | 22 | 18 | 19 | 20 | 21 | 22 |
| pH 7.0-5.5 | C | ⊙ | ⊙ | ⊙ | ⊙ | ⊙ | ⊙ | ⊙ | ⊙ | ⊙ | |
| | D | ⊙ | ⊙ | ⊙ | ⊙ | ⊙ | ⊙ | ⊙ | ⊙ | ⊙ | |
| | E | ⊙ | ⊙ | ⊙ | ⊙ | ⊙ | ⊙ | ⊙ | ⊙ | ⊙ | ⊙ |
| | F | ⊙ | ⊙ | ⊙ | ⊙ | ⊙ | ⊙ | ⊙ | ⊙ | ⊙ | ⊙ |
| | G | ⊙ | ⊙ | ⊙ | ⊙ | ⊙ | ⊙ | ⊙ | ⊙ | ⊙ | ⊙ |
| | H | ⊙ | ⊙ | ⊙ | ⊙ | ⊙ | ⊙ | ⊙ | ⊙ | ⊙ | ⊙ |
| | I | x | x | x | x | x | x | x | x | x | x |
| | J | x | x | x | x | x | x | x | x | x | x |
| | K | ⊙ | ⊙ | ⊙ | ⊙ | ⊙ | ⊙ | ⊙ | ⊙ | ⊙ | ⊙ |
| pH 5.5-3.0 | K | ⊙ | ⊙ | ⊙ | ⊙ | ⊙ | ⊙ | ⊙ | ⊙ | ⊙ | ⊙ |

Note:
⊙: not deformed
x: deformed

TEST 6

The purpose of this test is to exemplify the suitable percentages of multi-valent metalic ions in a liquid material.

In Tables 13 and 14, ingredients for samples 23–35 which are named as group I and samples L–X which are named as group II are shown, wherein all the ingredients other than 2 wt. % agar solution are obtainable in the market. Agar solution and LX were the same as used in Test 2.

TABLE 13

| | sample number of group I | | | | | | |
|---|---|---|---|---|---|---|---|
| ingredients | 23 | 24 | 25 | 26 | 27 | 28 | 29 |
| sugar | 200 | 200 | 200 | 200 | 200 | 200 | 200 |
| β-carotene | 1 | 1 | 1 | 1 | 1 | 1 | 1 |
| LX | 2 | 2 | 2 | 2 | 2 | 2 | 2 |
| LM | 10 | 10 | 10 | 10 | 10 | 10 | 10 |
| CaCl$_2$.anhydride | — | 0.1 | 0.3 | 0.7 | 2.7 | — | — |
| Fe(SO$_4$)$_3$.7H$_2$O | — | — | — | — | — | 0.2 | 0.5 |
| Al$_2$SO$_4$ anhydride | — | — | — | — | — | — | — |
| water | 787 | 786.9 | 786.7 | 786.3 | 784.3 | 786.8 | 786.5 |
| Fe ion | — | — | — | — | — | 4.02 | 10.05 |
| Al ion | — | — | — | — | — | — | — |

TABLE 13-continued

| Ca ion | — | 3.61 | 10.83 | 25.27 | 97.47 | — | — |

| ingredients | sample number of group I | | | | | |
|---|---|---|---|---|---|---|
| | 30 | 31 | 32 | 33 | 34 | 35 |
| sugar | 200 | 200 | 200 | 200 | 200 | 200 |
| β-carotene | 1 | 1 | 1 | 1 | 1 | 1 |
| LX | 2 | 2 | 2 | 2 | 2 | 2 |
| LM | 10 | 10 | 10 | 10 | 10 | 10 |
| $CaCl_2$ anhydride | — | — | — | — | — | — |
| $Fe(SO_4)_3 7H_2O$ | 1.2 | 5 | — | — | — | — |
| $Al_2SO_4$ anhydride | — | — | 0.3 | 0.6 | 1.5 | 6.3 |
| water | 785.88 | 782.0 | 786.7 | 786.4 | 785.5 | 780.3 |
| Fe ion | 24.11 | 100.45 | — | — | — | — |
| Al ion | — | — | 4.73 | 9.46 | 23.66 | 99.35 |
| Ca ion | — | — | — | — | — | — |

Note: Fe ion, Al ion, Ca ion = concentration of ions (mg/100 g)

TABLE 14

| ingredients | sample number of group II | | | | | |
|---|---|---|---|---|---|---|
| | L | M | N | O | P | Q |
| sugar | 200 | 200 | 200 | 200 | 200 | 200 |
| 2% agar sol. | 100 | 100 | 100 | 100 | 100 | 100 |
| gelatin | 15 | 15 | 15 | 15 | 15 | 15 |
| $CaCl_2$ anhydride | — | 0.3 | 1.2 | 2.7 | 4.2 | — |
| $FeSO_4.7H_2O$ | — | — | — | — | — | 0.5 |
| $Al_2(SO_4)_3$ anhydride | — | — | — | — | — | — |
| water | 685 | 684.7 | 683.8 | 682.3 | 680.8 | 684.5 |
| Ca ion (mg/100 g) | — | 10.83 | 43.33 | 97.47 | 151.66 | — |
| Fe ion (mg/100 g) | — | — | — | — | — | 10.05 |
| Al ion (mg/100 g) | — | — | — | — | — | — |

| ingredients | sample number of group II | | | | | | |
|---|---|---|---|---|---|---|---|
| | R | S | T | U | V | W | X |
| sugar | 200 | 200 | 200 | 200 | 200 | 200 | 200 |
| 2% agar sol. | 100 | 100 | 100 | 100 | 100 | 100 | 100 |
| gelatin | 15 | 15 | 15 | 15 | 15 | 15 | 15 |
| $CaCl_2$ anhydride | — | — | — | — | — | — | — |
| $FeSO_4.7H_2O$ | 2.0 | 5.0 | 7.4 | — | — | — | — |
| $Al_2(SO_4)_3$ anhydride | — | — | — | 0.6 | 2.5 | 6.3 | 9.5 |
| water | 683.0 | 680.0 | 677.6 | 684.4 | 682.5 | 678.7 | 675.5 |
| Ca ion (mg/100 g) | — | — | — | — | — | — | — |
| Fe ion (mg/100 g) | 40.18 | 100.45 | 148.67 | — | — | — | — |
| Al ion (mg/100 g) | — | — | — | 9.46 | 39.43 | 99.35 | 149.82 |

Liquid materials of samples 23–35 and samples L–X were respectively prepared using respective ingredients in the same manner as in Test 1. Each of the thus obtained samples were respectively heated to 90° C., and then cooled to 30° C. to form a gel which was destroyed to obtain a pasty material.

Using a part of each sample of group I as base materials, and a part of each sample of group II as sauce materials, dessert products each having an ornamental pattern were prepared in the same manner as in Test 1. The resulted products were subjected to stability test in the same manner as in Test 1. The results are shown in Table 15.

TABLE 15

| | | sample number of group I | | | | | | | | | | | |
|---|---|---|---|---|---|---|---|---|---|---|---|---|---|
| | | 23 | 24 | 25 | 26 | 27 | 28 | 29 | 30 | 31 | 32 | 33 | 34 | 35 |
| sample | L | x | x | x | x | x | x | x | x | x | x | x | x | x |
| number | M | x | x | x | x | x | x | x | x | x | x | x | x | x |
| of group I | N | x | x | x | x | x | x | x | x | x | x | x | x | x |
| | O | ◉ | ◉ | ◉ | x | x | ◉ | ◉ | x | x | ◉ | ◉ | x | x |
| | P | ◉ | ◉ | ◉ | x | x | ◉ | ◉ | x | x | ◉ | ◉ | x | x |
| | Q | x | x | x | x | x | x | x | x | x | x | x | x | x |
| | R | x | x | x | x | x | x | x | x | x | x | x | x | x |
| | S | ◉ | ◉ | ◉ | x | x | ◉ | ◉ | x | x | ◉ | ◉ | x | x |

TABLE 15-continued

| | sample number of group I | | | | | | | | | | | | |
|---|---|---|---|---|---|---|---|---|---|---|---|---|---|
| | 23 | 24 | 25 | 26 | 27 | 28 | 29 | 30 | 31 | 32 | 33 | 34 | 35 |
| T | ◉ | ◉ | ◉ | x | x | ◉ | ◉ | x | x | ◉ | ◉ | x | x |
| U | x | x | x | x | x | x | x | x | x | x | x | x | x |
| V | x | x | x | x | x | x | x | x | x | x | x | x | x |
| W | ◉ | ◉ | ◉ | x | x | ◉ | ◉ | x | x | ◉ | ◉ | x | x |
| X | ◉ | ◉ | ◉ | x | x | ◉ | ◉ | x | x | ◉ | ◉ | x | x |

Note:
◉ = not deformed
x = deformed

To the contrary, using a part of each sample of group II as base materials, and a part of each sample of group I as sauce materials, dessert products each having an ornamental pattern were prepared in the same manner as in Test 1. The resulted products were subjected to stability test in the same manner as in Test 1. The results exactly corresponded with those shown in Table 15.

From the results of Tests 3–6, it is exemplified that a desirably stable ornamental patten can be formed in a dessert product when a pair of combinations of the three conditions selected from 12 pairs are applied to one for base and the other for sauce, and the process of manufacturing dessert product recited in any of the claims are followed.

EXAMPLE 1

The ingredients as shown in Table 16 were prepared, wherein all the ingredients were obtainable in the market.

TABLE 16

| ingredients | base | sauce 1 | sauce 2 |
|---|---|---|---|
| skim milk powder | 12.00 | — | — |
| sugar | 10.00 | 15.00 | 15.00 |
| orange juice | — | 20.00 | — |
| melon juice | — | — | 20.00 |
| carrageenan | — | 0.20 | — |
| LM | — | 0.80 | 0.80 |
| agar | 0.20 | — | 0.20 |
| gelatin | 1.20 | — | — |
| coloring (orange) | — | 0.05 | — |
| coloring (green) | — | — | 0.05 |
| flavoring (vanilla) | 0.10 | — | — |
| flavoring (orange) | — | 0.10 | — |
| flavoring (melon) | — | — | 0.10 |
| water | 76.5 | 63.85 | 63.85 |
| total | 100 | 100 | 100 |

The liquid materials for base, sauce 1 and sauce 2 were separately prepared by dispersing and/or dissolving the respective ingredients as shown in Table 16 into water. The resulted liquid material were respectively pasteurized at 120° C. for 2 seconds by using plate heat exchanger (by APV company), and then each of them was cooled to 30° C. and each resulted gel was destroyed in turn by shearing force arising from its flow therein to thereby obtain pasty material for each of base and sauces. Using MTY packer (by TOHWA SEIKI), 30 ml of pasty base material was filled into a container with its main nozzle. While the base material maintained its flowability, 30 ml of pasty material for sauce 1 was extruded with its post filler onto the surface of base material, and then 20 ml of pasty material for sauce 2 was filled onto the surface of the base material with another nozzle to form an ornamental pattern. After sealing the container, they were cooled in a refrigerator to be solidified.

The thus obtained dessert having two kinds of jellies in different colors had good taste and good flavor, and stability of the ornamental pattern thereof excellent (cf. photograph 3 attached)

EXAMPLE 2

The ingredients as shown in Table 17 were prepared, wherein all the ingredients other than 2 wt. % agar solution and starter were sold in the market. The agar solution was prepared in the same manner as in Test 2. The starter was prepared in such a manner that 10 wt. % skim milk solution was sterilized. To the sterilzed solution *Lactobacillus bulgaricus* and *Streptococcus thermophillus* were innocurated and then fermented at 40° C. to thereby obtain fermented milk having acidity of 1.0 wt. % derived from lactic acid.

TABLE 17

| ingredients | base | sauce |
| --- | --- | --- |
| skim milk powder | 12.00 | — |
| sugar | 9.00 | 15.00 |
| orange juice | — | 20.00 |
| vegetable oil | 3.00 | — |
| emusifier | 0.10 | — |
| citric acid | — | 0.20 |
| 2 wt. % agar solution | 10.00 | — |
| gelatin | 0.80 | — |
| LX | — | 0.20 |
| LM | — | 0.90 |
| coloring | — | 0.05 |
| flavoring (orange) | — | 0.10 |
| starter | 3.00 | — |
| water | 62.1 | 63.55 |
| total | 100 | 100 |

All the ingredients for base other than 2 wt. % agar solution and starter were dispersed and/or dissolved into water. The resulted liquid was heated to 80° C. To the heated liquid, 2 wt. % agar solution was added. The resulted liquid was homogenized with a homogenizer (by SAN-MARU KIKAI KOGYO) under a pressure of 150 kg/cm² and then pasteurized at 90° C. for 10 minutes and then cooled to 40° C. To the pasteurized liquid, previously prepared starter was added and the resulted liquid was fermented at 40° C. until acidity derived from lactic acid reaches to 0.7 wt. %. The fermented liquid was then cooled to 25° C. to form a gel which was destroyed by agitating to obtain a pasty material for base.

All the ingredients for sauce were dispersed and/or dissolved into water. The resulted liquid was heated to 90° C., and then pasteurized at the same temperature for 10 minutes. The pasteurized liquid material for sauce was cooled to 20° C. for gelling. The resulted gelled material was agitated to obtain a homogeneous pasty material for sauce. Using the same MTY packer as used in Example 1, 60 ml of pasty material for base was filled into containers with its main filler. While the base material maintained its flowability, 30 ml of pasty material for sauce was filled with its post filler to form ornamental patterns therein. After sealing the containers, they were cooled for gelling. The resulted yogurt base dessert products having jelly pieces had excellent taste and good appearance, and their ornamental patterns were highly stable.

EXAMPLE 3

The ingredients obtainable in the market as shown in Table 18 were prepared.

TABLE 18

| ingredients | base | sauce |
| --- | --- | --- |
| skim milk powder | — | 5.00 |
| sugar | 15.00 | 5.00 |
| furcellaran | 0.06 | 0.06 |
| agar | 0.25 | — |
| gelatin | — | 0.80 |
| instant coffee | 1.00 | — |
| vegetable oil | — | 3.00 |
| emulsifier | — | 0.30 |
| flavoring (coffee) | 0.20 | — |
| flavoring (cream) | — | 0.10 |
| coloring (brown) | 0.10 | — |
| water | 76.20 | 52.80 |
| total | 100 | 100 |

All the ingredients for base were dispersed and/or dissolved into water, and the resulted liquid material for base was pasteurized at 120° C. for 2 seconds. The pasteurized liquid material was cooled to 40° C. to form a gel which was destroyed to obtain a pasty material for base.

All the ingredients for sauce were dispersed and/or dissolved into water, and the resulted liquid material for sauce was heated to 75° C., and then homogenized with a homogenizer under a pressure of 150 kg/cm². The homogenized liquid was pasteurized at 120° C. for 2 seconds, and cooled to 25° C. to form a gel which was in turn destroyed to obtain a pasty material for sauce. Using the MTY packer, 60 ml of pasty material for base was filled into containers with its main filler. Immediately thereaffter 20 ml of pasty sauce material was filled onto the surface of base material by using post filler of said MTY packer, and thereby ornamental patterns were formed. After sealing the containers, they were stored in a refrigerater for gelling. The resuled coffee jellies with cream had good flavor and good appearance, and the stability of ornamental patterns was excellent.

Now it will be understood that in accordance with the present invention, a beautiful dessert product can be manufactured without lack of clearness of boundary between sauce and base. Also various kinds of ornamental patterns can be formed by varying a number of nozzles, diameters and/or shapes of nozzles to be used and also by varying relative movements between the nozzles and a container during filling process. Furthermore any desired colors can be applied to base and sauces to manufacture a colorful dessert product, since running of colors is eliminated in the present invention. Still further continuous mass-production of dessert products having ornamental patterns can be achieved simplly, since the steps involved in the present invention does not require any complicated machine structures.

We claim:

1. A method of manufacturing a gelable dessert having an ornamental pattern, wherein a liquid base material and a liquid sauce material, each containing a gelling agent, are mixed to form the ornamental pattern, and then the mixed base and sauce material are cooled to form a gel, which process comprises:
    (a) separately preparing one or more sauce materials and a base material, each of said sauce and base materials containing at least two gelling agents selected from the group consisting of gelatin, agar, furcellaran, carrageenan, low methoxyl pectin and a mixture of locust bean gum and xanthan gum;
    (b) cooling each of said sauce material and base material to form a gel;

(c) agitating each gel to form a pasty sauce material and a pasty base material;
(d) filling a container with said pasty base material and then extruding one or more pasty sauce materials thereon to form an ornamental dessert; and
(e) cooling said ornamental dessert to gel the same.

2. The method of claim 1, wherein a mixture of locust bean gum and xanthan gum is used as the gelling agents in the liquid base or liquid sauce materials or both, wherein a weight ratio of the locust bean gum to xanthan gum of 1:10 to 2:1 is used.

3. The method of claim 1, wherein said gelable dessert comprises a jelly, a pudding, a babarois, a yogurt, a mousse and a jellied bean paste.

* * * * *

UNITED STATES PATENT AND TRADEMARK OFFICE
CERTIFICATE OF CORRECTION

PATENT NO. : 4,717,571

DATED : January 5, 1988

INVENTOR(S) : Shigeo Okonogi ET AL

It is certified that error appears in the above-identified patent and that said Letters Patent is hereby corrected as shown below:

Column 1, line 65: delete -- a --.

Column 2, line 20: "become", should read -- becomes --;

line 33: "metod", should read -- method --;

line 39: "continuous", should read -- continuously --;

line 54: "metalic", should read -- metallic --;

line 64: "metalic", should read -- metallic --.

Column 3, line 1: after "related", insert -- to --;

Column 4, line 8: "tewmperatures", should read -- temperatures --;

line 41: "sellected", should read -- selected --.

Column 5, in the note below the table: "LM: low methoxy pectin", should read -- LM: low methoxyl pectin;

Column 5, line 48: "veiw", should read -- view --;
        line 59: "destroied:, should read -- destroyed --;
        line 62: "martertial", should read -- material --.

Column 6, line 28: "After", should read -- Adding --;

Column 7, line 1: "generaly", should read -- generally --;

line 36: "uid", should read -- uids --;

UNITED STATES PATENT AND TRADEMARK OFFICE
CERTIFICATE OF CORRECTION

PATENT NO. : 4,717,571                                Page 2 of 5
DATED      : January 5, 1988
INVENTOR(S): Shigeo Okonogi ET AL It is certified that error appears in the above-identified patent and that said Letters Patent is hereby corrected as shown below:

line 37: after "mixed", insert -- with --;

line 40: "untill", should read -- until --;

line 41: "reach", should read -- reached --;

line 42: "were", should read -- was --;

line 45: "spesific", should read -- specific --;

line 46: "were", should read -- was --;

line 62: "sametime", should read -- same time --;

line 62: "indused", should read -- induced --;

line 64: after "temperature", insert -- at which --;

line 65: "in", should read -- the --.

Column 8, line 12: "were", should read -- was --;

line 16: "were", should read -- was --;

line 17: "velosities", should read -- velocities --;

line 18: "They", should read --Then--;

line 41: "formed", should read -- form --;

line 43: after "subjected to", insert -- a --.

Column 9, line 9: "forma", should read -- form --;

UNITED STATES PATENT AND TRADEMARK OFFICE
CERTIFICATE OF CORRECTION

PATENT NO. : 4,717,571   Page 3 of 5

DATED : January 5, 1988

INVENTOR(S) : Shigeo Okonogi ET AL

It is certified that error appears in the above-identified patent and that said Letters Patent is hereby corrected as shown below:

line 17: "desirablly", should read -- desirably --;

line 21: "verocity", should read -- velocity --;

line 66: "obtaind", should read -- obtained --.

Column 10, line 11: "verocity", should read -- velocity --;

line 50: "were", should read -- was --;

line 51: delete "Then they were adjusted their", and insert -- The pH was then adjusted --;

line 53: delete "pH";

line 65: "shows", should read -- show --.

Column 11, line 3: "carraggeenan", should read -- carrageenan --;

line 9: delete "and they were ad-";

line 10: delete "justed their pH" and insert -- The pH was then adjusted --;

line 14: delete "        TABLE 10        ";

line 28: insert --        TABLE 10        --;

line 36: "shows", should read -- show --;

line 49: "were", should read -- was --;

line 51: "destributed", should read -- distributed --.

UNITED STATES PATENT AND TRADEMARK OFFICE
CERTIFICATE OF CORRECTION

PATENT NO. : 4,717,571

DATED : January 5, 1988

INVENTOR(S) : Shigeo Okonogi ET AL

It is certified that error appears in the above-identified patent and that said Letters Patent is hereby corrected as shown below:

line 52: after "HCl", insert -- the pH of --;

line 53: after "adjusted", delete -- their pH--.

Column 12, line 2: "homogenous", should read -- homogeneous --;

line 7: after "subjected to", insert -- a --;

line 29: add -- a -- at beginning of line;

line 36, in TABLE 12, subheading 22, add -- ◎ --;

line 37, subheading 22, add -- ◎ --;

Column 14, line 21: "Patten", should read -- Pattern --;

line 23: "are", should read -- is --;

line 26: "are", should read -- is --;

line 53: "resulted", should read -- resulting --;

Column 15, line 3: after "thereof", insert -- was --;

line 12: "sterilzed", should read -- sterilized --;

line 14: "innocurated", should read -- innoculated --;

line 44: "reaches", should read -- reached --;

line 63: "appearence", should read -- appearance --.

Column 16, line 35: "refrigerater", should read -- refrigerator --;

UNITED STATES PATENT AND TRADEMARK OFFICE
CERTIFICATE OF CORRECTION

PATENT NO. : 4,717,571

DATED : January 5, 1988

INVENTOR(S) : Shigeo Okonogi ET AL

It is certified that error appears in the above-identified patent and that said Letters Patent is hereby corrected as shown below:

line 35:   "resuled", should read -- resulting --;

line 51:   "simplly", should read -- simply --;

line 52:   "does", should read -- do --.

Column 17, line 8:   "agents", should read -- agent --.

Signed and Sealed this

Third Day of September, 1991

Attest:

HARRY F. MANBECK, JR.

*Attesting Officer*       *Commissioner of Patents and Trademarks*